US007780804B2

(12) United States Patent
Kiessling

(10) Patent No.: US 7,780,804 B2
(45) Date of Patent: Aug. 24, 2010

(54) SUPPORT WITH A MATERIAL LAYER AND METHOD FOR THE PRODUCING OF A SUPPORT

(75) Inventor: Volkmar Kiessling, Villingendorf (DE)

(73) Assignee: Köra-Packmat Maschinenbau GmbH, Villingendorf (DE)

( * ) Notice: Subject to any disclaimer, the term of this patent is extended or adjusted under 35 U.S.C. 154(b) by 219 days.

(21) Appl. No.: 12/224,139

(22) PCT Filed: Feb. 20, 2007

(86) PCT No.: PCT/DE2007/000316

§ 371 (c)(1), (2), (4) Date: Aug. 19, 2008

(87) PCT Pub. No.: WO2007/095914

PCT Pub. Date: Aug. 30, 2007

(65) Prior Publication Data

US 2009/0008022 A1 Jan. 8, 2009

(30) Foreign Application Priority Data

Feb. 23, 2006 (DE) ....................... 10 2006 008 435

(51) Int. Cl.
*B32B 37/00* (2006.01)

(52) U.S. Cl. ...................................... 156/73.1; 156/238

(58) Field of Classification Search ................ 156/73.1, 156/230, 238, 240, 538–542, 580.1, 580.2
See application file for complete search history.

(56) References Cited

U.S. PATENT DOCUMENTS 6,596,108 B2 * 7/2003 McCabe .................... 156/73.1

FOREIGN PATENT DOCUMENTS

| | | |
|---|---|---|
| DE | 37 15 146 | 12/1988 |
| EP | 1 088 924 | 4/2001 |
| JP | 60 183147 | 9/1985 |
| JP | 2004 050687 | 2/2004 |
| WO | WO 97/49499 | 12/1997 |

* cited by examiner

*Primary Examiner*—James Sells
(74) *Attorney, Agent, or Firm*—Paul Vincent

(57) ABSTRACT

An information support (12) has at least one piece of information which is provided on the information support (12). The information is covered by material layer which is released by means of ultrasonic sonotrode (18) from a hot-stamping strip (24) wherein the material layer is transferred to the information support (12) at the position at which the information on the information support (12) is to be covered. The transfer of material layers onto an information support can be effected rapidly and in an economical fashion at low temperatures using the ultrasonic sonotrode. The ultrasonic sonotrode preferably operates in an oscillatory region between 15,000 and 35,000 Hz. The information support (12) can be configured as a support which accepts a material layer without covering information on the support.

6 Claims, 2 Drawing Sheets

SUPPORT WITH A MATERIAL LAYER AND METHOD FOR THE PRODUCING OF A SUPPORT

This application is the national stage of PCT/DE2007/000316 filed on Feb. 20, 2007 and also claims Paris Convention priority to DE 10 2006 008 435.7 filed on Feb. 23, 2006.

BACKGROUND OF THE INVENTION

The invention concerns a support with a material layer, in particular an information support, wherein the material layer is a colored layer and is introduced onto the support using an ultrasonic sonotrode as well as a method for the production of a support, in particular for the protection of data deposited on an information support, wherein the information is covered with the material layer which bonds firmly to the information and the material layer is destroyed to remove same without damaging the information.

Supports of this kind are for example utilized as information supports, wherein the colored layer is used as a cover for a secret numerical code. WO 97/49499 discloses the use of liquids such as paints as the colored layer which are introduced by means of ultrasonic sonotrodes in a dosed fashion onto the support to thereby create a homogenous cover of the support. A material web which is to be coated is guided over the surface of the ultrasonic sonotrode wherein, with the application of pressurized air and/or with correspondingly running rollers and an appropriate tension of the material web, a defined pressing is produced. DE 3715146A1 discloses the welding or gluing of material webs, in particular packaging material, using ultrasonic technology and ultrasonic sonotrodes with the associated anvil portions being moved towards each other and using an overlay of vibrational motion for processing, such as welding, the material web.

Ultrasonic sonotrodes permit very thin material layers to be introduced onto the information support with very strong bonding thereto without subjecting the information support to high temperatures. The transferred material layer can, if necessary, be kept very thin and be permanently attached to the support. Ultrasonic sonotrodes can achieve a very high production speed and a covering of this kind is safe and economical. The sonotrode produces ultrasonic vibrations of defined area which activate the material layer which is to be introduced onto the information support and intensively bond that layer to the information support. Information which lies underneath the material layer, such as an a numerical code, is covered in a secure and unrecognizable fashion and can only be exposed upon destruction of a material layer, wherein the information, in this case a numerical code, is not thereby damaged for further use.

SUMMARY OF THE INVENTION

It is the object of the present invention to provide, in a reliable and effective manner, a support, in particular an information support having a strongly bonded, well-covering material layer for manipulation-proof covering of the information on the information support. Moreover, it is the intention to develop a method for introduction of a material layer onto a support, in particular for covering information on an information support.

This purpose of creating a support, in particular an information support, is achieved in accordance with the invention in that, the colored layer is transferred from a support strip of a hot-stamping strip onto the support.

The ultrasonic sonotrode releases the material layer which is to be transferred from the hot-stamping strip and deposits same in a permanently bonded fashion onto the support. The material layer, one or a plurality of differing colored layers, is permanently introduced onto all supports by means of the ultrasonic sonotrode utilized in accordance with the invention within the context of the thermal transfer procedure. With the hot pressing procedure, temperatures of T=200° C. are required. The colored layer which is to be transferred can be thermally activated in a point-like manner or over a region which is defined so that no high temperature in the vicinity of the transfer of the material layer occurs on the information support. Temperatures of approximately T=50° C. are normal and higher temperatures only occur in the region of direct transfer of the colored layer onto the information support. The ultrasonic sonotrode permits introduction of the colored layer onto the information support for covering the information in such a fashion that the strongly bonded covering of the safeguarded information is achieved without damaging that information.

An information support of this type can preferentially be a prepaid card for communication devices as utilized in conjunction with mobile telephones. The numerical code printed on the prepaid card can be an alpha numerical code which is to be uncovered in a manner which is free from manipulation and is covered securely until the time at which its exposure is wished.

The method steps for producing a support in accordance with the invention are carried out in such a fashion as to preferably cover the information on the information support by introducing a material layer onto the support. The support or information support thereby proceeds on a conveyor belt through a gap between an ultrasonic sonotrode and an anvil. While passing through the gap, the ultrasonic sonotrode loads a hot-stamping strip running through the gap together with the support, wherein the hot-stamping strip has a support band with a colored layer. These objects are urged against an anvil and, in the pressed state and under activation of ultrasonic sonotrode, an area section of color is released from the support strip and deposited in a secure fashion on top of the information on the information support.

The ultrasonic vibrations produce heat in the colored layers of the thermal strip, wherein these colored layer sections can be permanently deposited to cover a desired information on the information support in a permanent fashion.

In a preferred embodiment of the invention, a rotational sonotrode can be utilized as the ultrasonic sonotrode having a plurality of sonotrode horns about its periphery which, for example, are configured as stamps and which cooperate with a rotationally borne anvil. A conveyor belt can be used to pass both an information support as well as a hot-stamping strip between the anvil and the rotational sonotrode and the elevated stamp of the rotational sonotrode produces an increased material pressing in the region of the anvil to introduce ultrasonic vibrations into the hot-stamping strip for releasing a colored layer onto the information support.

In another advantageous embodiment, the ultrasonic sonotrode is a fixed sonotrode whose head extends along the direction of passage of the conveyor belt and the anvil rotates while the information is covered. A sonotrode of this kind permits cyclic operation. The sonotrode continues to vibrate even during the neutral phases and the anvil has elevated stamping surfaces by means of which a high degree of material pressing of the information support and the hot-stamping strip can be achieved when they are located between the sonotrode and the anvil.

Additional embodiments of the invention, comprise a stationary ultrasonic sonotrode whose head extends transverse to the direction of a passage of the conveyor belt, wherein the anvil rotates during covering of the information. A device of this kind, directed in this fashion, permits the covering of information on an information carrier which extends transverse to the direction of motion of the conveyor belt.

In further configurations of the invention, a plurality of different or identical ultrasonic sonotrodes can be cascaded, one behind the other, with a plurality of anvils in order to cover the most different kinds of information on information carriers by transferring ultrasonic vibrations and warmth onto a thermal strip to release sections of colored layers therefrom which are then deposited in a securely bonded fashion onto the information support to permanently cover that information without damaging same. Clearly, all advantageous embodiments for disposing the material layer on the information support for the covering of information as well as for the transfer of a material layer onto the support per se are also the purpose of the instant invention, wherein the material layer must not necessarily cover information.

Further features and advantages of the invention can be extracted from the subsequent description of embodiments of the invention with regard to the drawings which contain details important to the invention. The individual features can be used in embodiments of the invention, individually or collectively and in arbitrary combination.

DESCRIPTION OF THE PREFERRED EMBODIMENT

Figure 1:
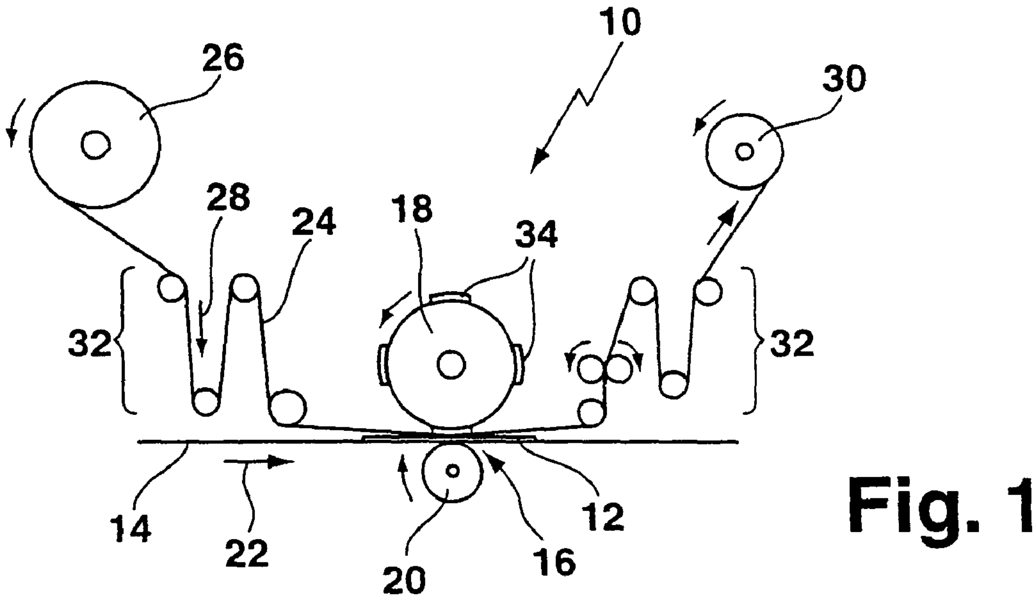
FIG. 1 shows a highly schematic device in cross-section illustrating procedural steps used to cover information on an information support by means by an ultrasonic rotational sonotrode while releasing a colored layer from a hot-stamping strip.

FIG. 1 illustrated a device 10 for covering information on an information support 12, which travels on a conveyor belt 14 through a gap 16 between an ultrasonic rotational sonotrode 18 and a rotationally borne anvil 20. The conveyor belt 14 moves in the direction of arrow 22. A hot-stamping strip 24 is guided through the gap 16 and seats in the vicinity of the ultrasonic rotational sonotrode 18 in a secure manner on the information support 12. The sonotrode head or the sonotrode horn exercises an appropriate pressure on the anvil 20 to release a material layer from the hot-stamping strip 24 or from a thermal strip under the influence of ultrasonic vibrations and transfer same to an information carrier 12.

The hot-stamping strip 24 is supplied from a supply roller 26 and travels in the form of a strip in the direction of arrow 28 through the gap 16 and is subsequently wound on wind-up roller 30. Tensile rollers 32 compensate for tensile forces which occur between the supply roller 26 and the ultrasonic rotational sonotrode 18 as well as between the ultrasonic rotational sonotrode 18 and the wind-up roller 30, which can occur between the supply roller 26 and the wind-up roller 30 during the transport procedure.

The ultrasonic rotational sonotrode 18 has a plurality of raised stamps 35 (horns) disposed about its periphery which produce the required pressing of the material when they are directly opposed to the anvil 20 in order to introduce the ultrasonic vibrations into the material in the hot-stamping strip 24 for releasing desired section of the colored layer from the support material of the hot-stamping strip 24 to permanently deposit the colored layer onto the information support 12. The ultrasonic rotational sonotrode 18 produces the desired ultrasonic vibrations in the vicinity of the stamp 34, which have a desired size for releasing the colored layer from the hot-stamping strip 24.

Figure 2:
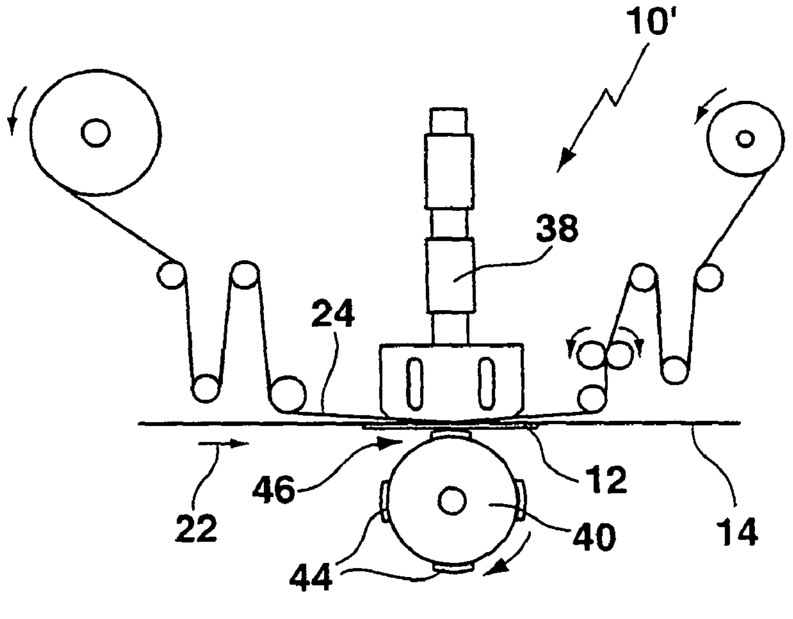
FIG. 2 shows a device for covering information on an information support having a stationary ultrasonic sonotrode whose head extends along the direction of motion of the conveyor belt.

FIG. 2 shows an additional device 10' for covering information on an information support 12 with a colored layer from a hot-stamping strip 24, wherein a stationary ultrasonic sonotrode 38 is utilized whose head extends along the conveyor belt direction 14. In contrast to the operation of the device 10 of FIG. 1, the device 10' presses an anvil 40 against the information carrier 12 from a lower side and against a head of the stationary ultrasonic sonotrode 38 to a sufficiently strong extent that the ultrasonic vibrations release the required colored layer from the support strip 24 which is disposed between the information carrier and the head of the stationary ultrasonic sonotrode 38 such that the information carrier 12 can be covered. The stamp 44, disposed about the periphery of the anvil 40, effects the required material pressure necessary for material transfer. In the procedure of FIG. 1, the material pressure is directly introduced onto the hot-stamping strip 24 and the information carrier 12 by means of the ultrasonic rotational sonotrode 18. With the procedure shown in FIG. 1, more precise information transfer loading can be achieved.

Figure 3:
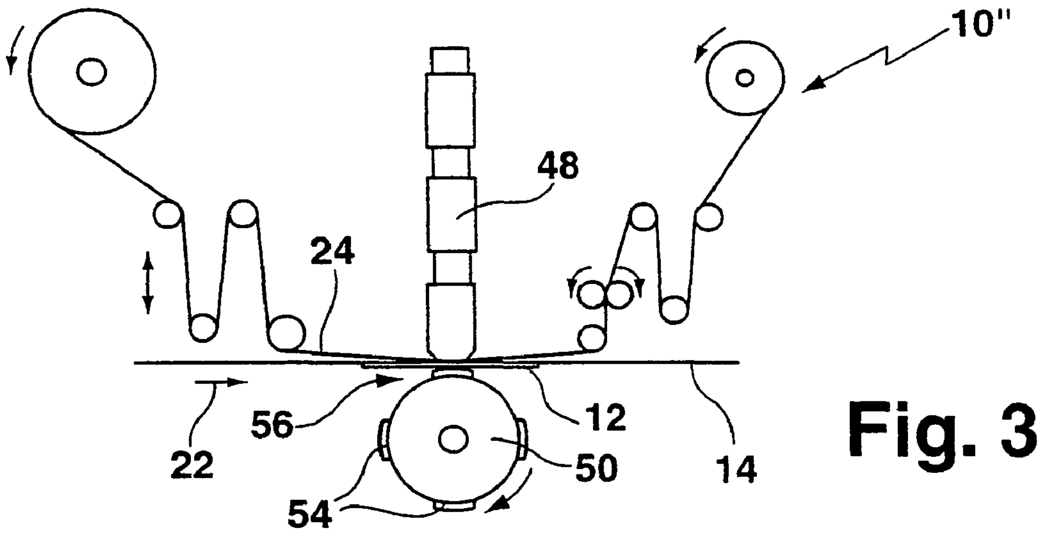
FIG. 3 shows a device having a stationary ultrasonic sonotrode whose head extends transverse to the direction of passage of the conveyor belt.

FIG. 3 shows an additional embodiment of the device 10" with a stationary ultrasonic sonotrode 48 whose head extends transverse to the direction of the conveyor belt 14. With a configuration of this type, it is possible to cover information on information carrier 12 which extends over a wide range transverse to the directional motion of the conveyor belt 14. The necessary material pressure is once more effected indirectly by means of an anvil 50 which presses the information support 12 against the head of the stationary ultrasonic sonotrode 48 by means of a stamp 54. The ultrasonic sonotrodes 38, 48 also vibrate in neutral positions but only transfer material layers from the support strip 24 onto the information support 12 in the vicinity of the stamp 54. Only in the vicinity of the stamp 54 is the gap 56 sufficiently narrow to effect material pressing for use of the ultrasonic vibrations produced by the ultrasonic sonotrodes 38, 48 to release the material layer from the hot-stamping strip 24 and to cover the respective information support 12.

Figure 4:
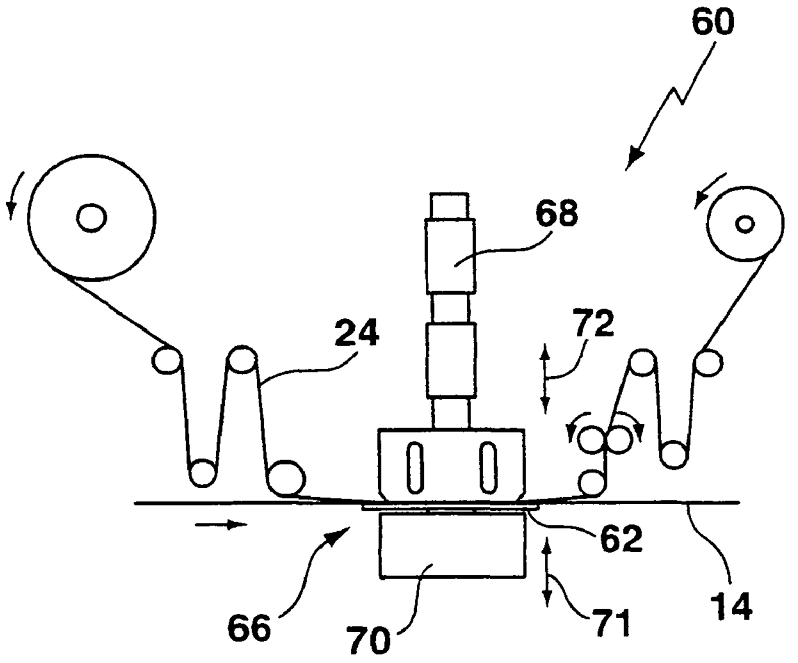
FIG. 4 shows a covering device having an ultrasonic sonotrode which can be moved in a vertical direction.

FIG. 4 shows an embodiment of a device having a vertically displaceable ultrasonic sonotrode 68 which can be pressed against an anvil 70, which can also be displaced in the vertical direction. A support or an information support 68 is disposed in a gap 66 and the gap 66 between the ultrasonic sonotrode 68 and the anvil 70 is narrowed in the direction of arrows 71, 72 to a sufficient extent that the ultrasonic vibrations release the material layer from the hot-stamping strip 24 which is transferred in a permanent fashion onto the support or information support 62. The conveyor belt 14 and the hot-stamping strip 24 are stationary during transfer of the material layer to the support or information support 62. The device 60 works in a cyclical fashion. When transfer of the material layer onto the support or the information support is finished, the ultrasonic sonotrode 68 and the anvil 70 are displaced sufficiently in the direction of arrow 71 and 72 that the gap 66 is large enough to permit a covered support or information support to be moved by the conveyor belt 14 away from the vicinity of the ultrasonic sonotrode 68 and of the gap 66.

A information support or support 12 has at least one kind of information which is provided on an information support 12 and the information is covered by a material layer which is separated from a hot-stamping strip 24 by an ultrasonic sonotrode 8. The material layer is transferred onto the information support or support 12 at the location at which the information on the information support 12 should be covered. Transfer of the material layers by the ultrasonic sonotrode onto the information support achieves a more rapid and economical process with low temperatures. The ultrasonic sonotrode preferably works in an oscillatory range between 15,000 and Hz. The information support 12 can be configured as a support which accepts a material layer without covering the information on the support.

I claim:

1. A method for the production of an information support upon which at least one piece of information is disposed, wherein a material layer covers information on the information support, the material layer bonding securely on the information and, upon destruction of the material layer, the material layer can be removed without damaging the information, the method comprising the steps of:

a) passing the information support, disposed on a conveyor belt, through a gap between an ultrasonic sonotrode and an anvil;

b) pressing, when passing through the gap and using the ultrasonic sonotrode, a hot-stamping strip, having a support strip with a colored layer, against the information support and against the anvil; and c) releasing, during step b) and under activation of ultrasonic vibrations, an area section of the colored layer from the support strip to permanently attach that colored layer section over the information on the information support.

2. The method of claim 1, wherein a rotational sonotrode is utilized as the ultrasonic sonotrode and the anvil is borne for rotation and rotates for introduction of the colored layer onto the information support.

3. The method of claim 1, wherein a stationary or vertically displaceable sonotrode is utilized as the ultrasonic sonotrode whose head extends along a direction of passage of the conveyor belt, wherein the anvil can rotate or can be moved in a vertical direction during the covering procedure.

4. The method of claim 1, wherein a stationary sonotrode is utilized as the ultrasonic sonotrode having a head which extends transverse to a direction of passage of the conveyor belt, wherein, while covering the information, the anvil rotates or can be moved in a vertical direction.

5. The method of claim 1, wherein a plurality of ultrasonic sonotrodes and a plurality of anvils are disposed and utilized, one after the other.

6. The method of claim 1, wherein the information support is configured as a prepaid card for communication devices or for mobile telephones.

* * * * *